United States Patent
Collins

(10) Patent No.: US 6,714,189 B2
(45) Date of Patent: Mar. 30, 2004

(54) COMBINATION PRIMARY MOUSE CONTROLLER AND CHILD'S MOUSE CONTROLLER

(76) Inventor: John W. Collins, 409 Via Montego, San Clemente, CA (US) 92672

( * ) Notice: Subject to any disclaimer, the term of this patent is extended or adjusted under 35 U.S.C. 154(b) by 137 days.

(21) Appl. No.: 09/921,041

(22) Filed: Aug. 2, 2001

(65) Prior Publication Data

US 2003/0025672 A1 Feb. 6, 2003

(51) Int. Cl.[7] .......................... G09G 5/08; A63F 13/00
(52) U.S. Cl. ..................................... 345/163; 463/37
(58) Field of Search ............................... 345/163, 164, 345/165, 166; 463/37

(56) References Cited

U.S. PATENT DOCUMENTS

| | | |
|---|---|---|
| 4,353,552 A | 10/1982 | Pepper, Jr. |
| 4,588,187 A | 5/1986 | Dell |
| 5,421,590 A | 6/1995 | Robbins |
| D381,640 S | 7/1997 | Drennan et al. |
| 5,751,273 A | 5/1998 | Cohen |
| 5,907,318 A | 5/1999 | Medina |
| 5,917,472 A | 6/1999 | Perala |
| 6,018,337 A * | 1/2000 | Peters et al. ................. 345/723 |
| 6,107,990 A * | 8/2000 | Fleming, III ................. 345/157 |
| 6,204,837 B1 | 3/2001 | Smith |
| 6,452,587 B1 * | 9/2002 | Nikom ........................ 345/167 |
| 6,466,831 B1 * | 10/2002 | Shibata et al. ................ 700/85 |

* cited by examiner

Primary Examiner—Richard Hjerpe
Assistant Examiner—M. Fatahiyar
(74) Attorney, Agent, or Firm—Eric Karich

(57) ABSTRACT

A combination primary mouse controller and child's mouse controller for controlling a computer through a computer port includes a primary mouse controller and a child's mouse controller. The primary mouse controller is shaped for use by an adult user once the primary mouse controller has been operably attached to the computer port. The child's mouse controller is shaped for use by a child user and is capable of operable engagement with the primary mouse controller. The primary mouse controller includes a sensor for sensing insertion of the second connector into the auxiliary port. The primary mouse controller also includes a selector for directing control between the input mechanism and the auxiliary port in response to the sensor such that the input mechanism is operatively connected with the connector until the second connector is inserted into the auxiliary port, upon which the operative connection is switched from the input mechanism to the auxiliary port.

7 Claims, 10 Drawing Sheets

COMBINATION PRIMARY MOUSE CONTROLLER AND CHILD'S MOUSE CONTROLLER

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to mouse controllers, and more particularly to a combination primary mouse controller and child's mouse controller for controlling a computer.

2. Description of Related Art

The following art defines the present state of this field:

Perala, U.S. Pat. No. 5,917,472, teaches a first mouse controller that is adapted to operably engage a second mouse controller so that both controllers can be used to control a cursor. In one embodiment, the first mouse controller includes three jump-switches to enable control to be alternated between the first mouse and the second mouse. In another embodiment, firmware is used to control which of the buttons are active.

Other prior art devices function simultaneously with the function of the primary control device. For example, Cohen, U.S. Pat. No. 5,751,273, teaches a game controller for infants that functions to control a computer display based upon the movements of a "control wand" along a plane perpendicular to the wand. The control wand functions simultaneously with the function of an ordinary mouse. Additional examples of this structure are shown in Robbins, U.S. Pat. No. 5,421,590 (multiple linked game controllers), Smith, U.S. Pat. No. 6,204,837 (computer device having multiple pointing devices), Dell, U.S. Pat. No. 4,588,187 (port expansion adapter for video game port), Pepper, Jr., U.S. Pat. No. 4,353,552 (touch panel system), Medina, U.S. Pat. No. 5,907,318 (foot-controlled computer mouse), and Drennan et al., U.S. Des. 381,640 (computer mouse having an audio interface.

The prior art teaches the use of multiple control devices to control a computer. However, the prior art does not teach a child's mouse controller that can be attached to a primary mouse controller, the primary mouse controller automatically switching operable control of the computer from the primary mouse controller to the child's mouse controller so that a child can use a mouse specially designed for a child without disconnecting the primary mouse controller. The present invention fulfills these needs and provides further related advantages as described in the following summary.

SUMMARY OF THE INVENTION

The present invention teaches certain benefits in construction and use which give rise to the objectives described below.

The present invention provides a combination primary mouse controller and child's mouse controller for controlling a computer through a computer port. The primary mouse controller is shaped for use by an adult user once the primary mouse controller has been operably attached to the computer port. The child's mouse controller is shaped for use by a child user and is capable of operable engagement with the primary mouse controller. The primary mouse controller includes a means for sensing insertion of the second connector into the auxiliary port. The primary mouse controller also includes a means for directing control between the input mechanism and the auxiliary port in response to the means for sensing insertion such that the input mechanism is operatively connected with the connector until the second connector is inserted into the auxiliary port, upon which the operative connection is switched from the input mechanism to the auxiliary port.

A primary objective of the present invention is to provide a combination primary mouse controller and child's mouse controller having advantages not taught by the prior art.

Another objective is to provide a child's mouse controller that enables a child to more easily control a computer.

A further objective is to provide a primary mouse that enables the operable connection of the child's mouse controller to the computer without disconnecting the primary mouse controller from the computer.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
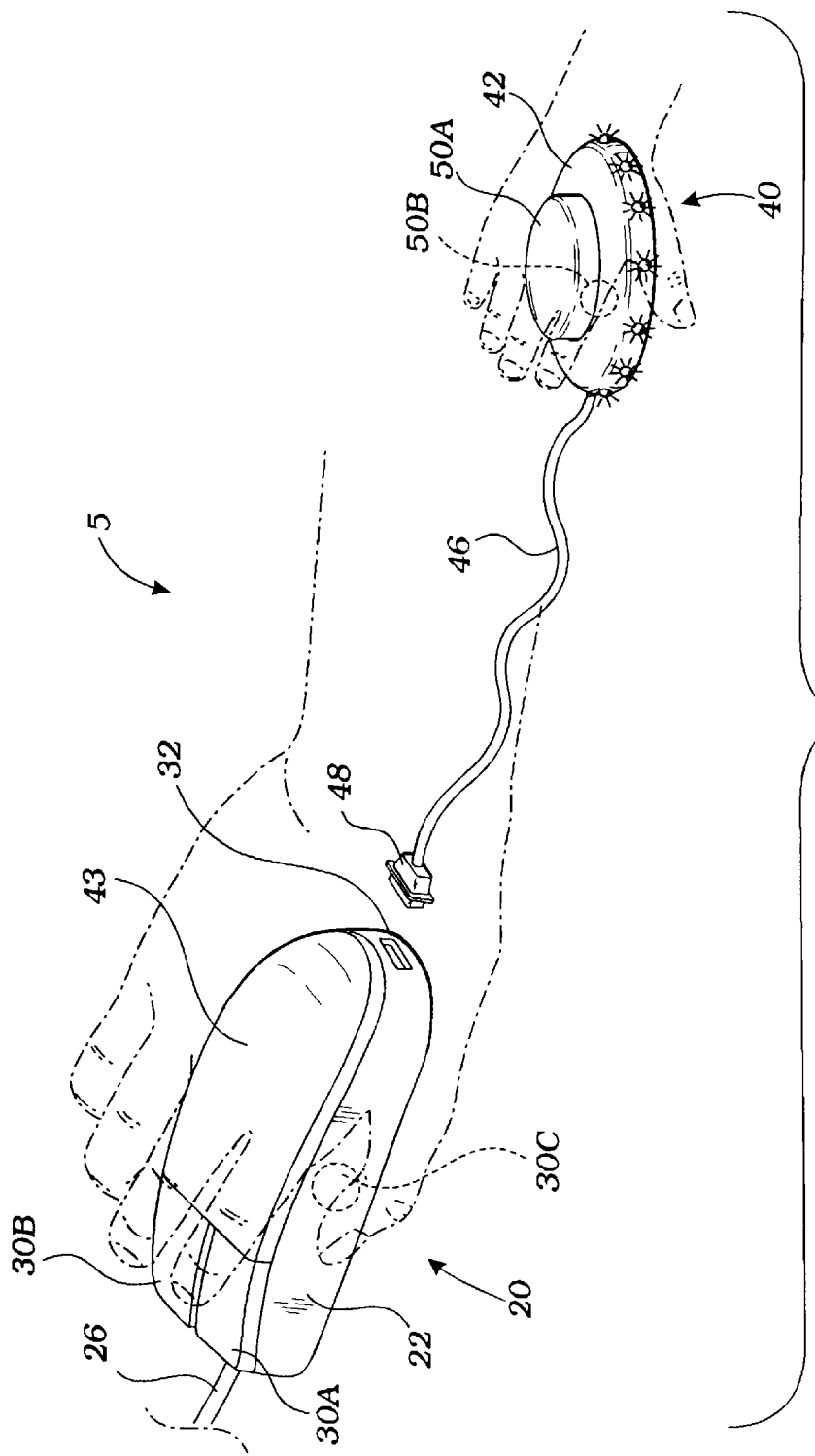
FIG. 1 is a perspective view of the preferred embodiment of the present invention.

The above described drawing figures illustrate the invention, a combination primary mouse controller and child's mouse controller 5 for controlling a computer 10 through a computer port 12. The combination 5 includes a primary mouse controller 20 and a child's mouse controller 40. The primary mouse controller 20 is shaped for use by an adult user once the primary mouse controller 20 has been operably attached to the computer port 12, as described below. The child's mouse controller 40 is shaped for use by a child user. The child's mouse controller 40 is capable of operable engagement with the primary mouse controller 20, and such engagement functions to transfer operable control of the computer 10 from the primary mouse controller 20 to the child's mouse controller 40.

Figure 2:
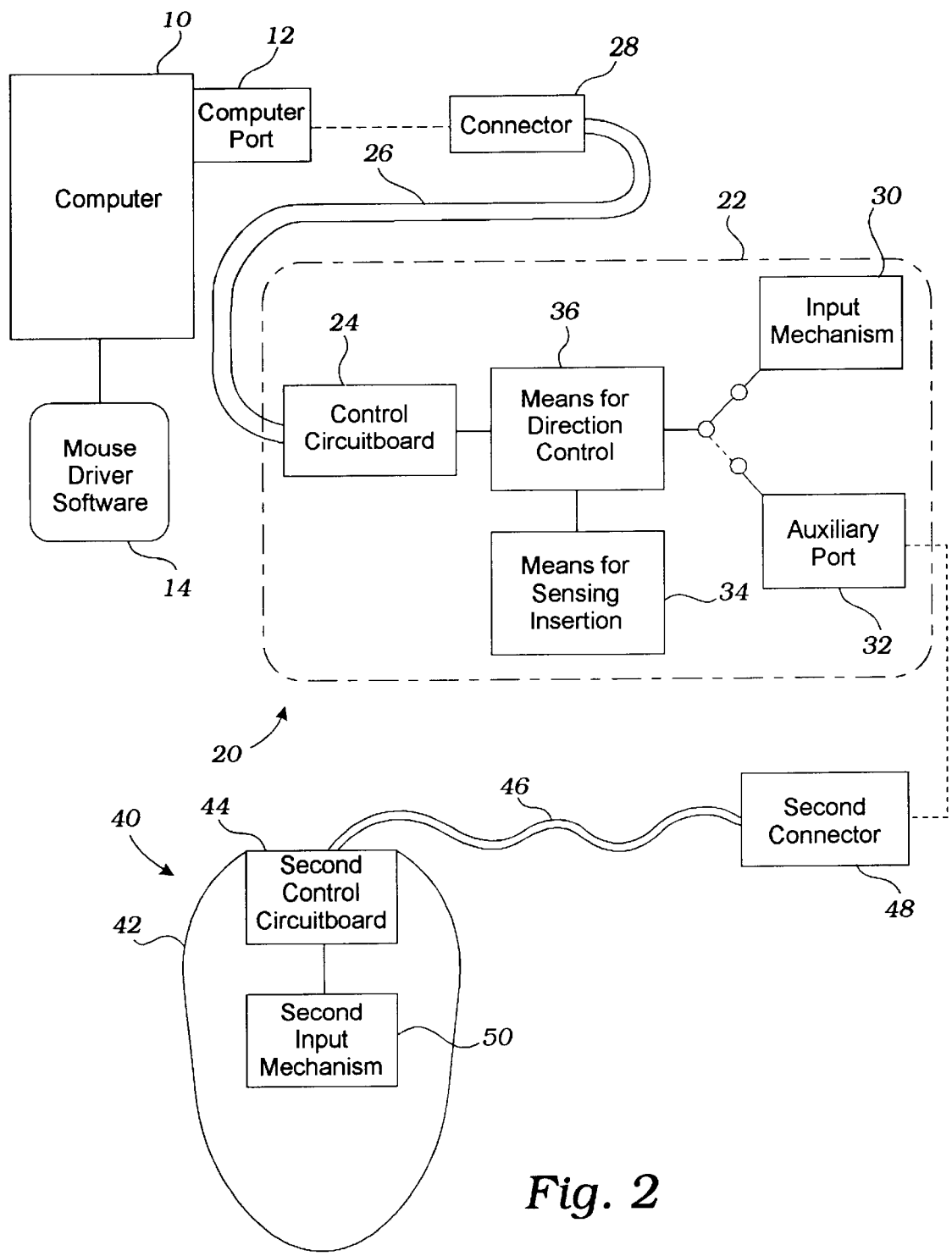
FIG. 2 is a block diagram thereof.

As shown in FIG. 1, the primary mouse controller 20 includes a housing 22 that is shaped to ergonomically fit the hand of an adult user. As shown in FIG. 2, the housing 22 is shaped to contain a control circuit board 24 and the related operable components of the primary mouse controller 20, described in greater detail below. Similar housings 22 can take many forms and are well known in the art, so the housing 22 is not described in any greater detail herein.

As shown in FIGS. 1 and 2, the control circuit board 24 is operably connected to a connector 28 with a first communication cable 26. The connector 28 is adapted to operably connect with the computer port 12, thereby enabling data communication from the computer 10 to the control circuit board 24 through the first communication cable 26. This structure is well known in the art, and equivalent to alternative arrangements such as a wireless connection or similar connection also well known in the art.

As shown in FIG. 2, the primary mouse controller 20 also includes an input mechanism 30 operatively mounted on or in the housing 22 and operatively connected to the control circuit board 24. The input mechanism 30 preferably includes a roller ball 30C and first and second buttons 30A and 30B. The roller ball 30C is rotatably mounted under the housing 22. Since the roller ball 30C is well known in the art, it is not described in greater detail herein. The first and second buttons 30A and 30B are operably mounted such that they can be readily operated by the user to "click" and make selections using the primary mouse controller 20, also as is well known in the art. Of course, additional controls that are well known in the art, such as a third button (not shown) or a roller for scrolling (not shown) are also well known in the art and can be added to the present invention without altering the basic concept of the invention.

As shown in FIG. 2, the primary mouse controller 20 also includes an auxiliary port 32 operatively mounted on or in the housing 22 and operatively connected to the control circuit board 24. The auxiliary port 32 is positioned to receive the second connector 48 of the child's mouse controller 40, described below. The auxiliary port 32, the computer port 12, the connector 28, and the second connector 48 are preferably mating components that form USB connections, or alternative connections that provide similar data connections.

The primary mouse controller 20 further includes a means for sensing insertion 34 of the second connector 48 into the auxiliary port 32. The means for sensing insertion 34 is preferably provided by an electronic sensor that is operably positioned within or adjacent to the auxiliary port 32 such that it is triggered when the second connector 48 makes an electronic connection with the auxiliary port 32. In an alternative embodiment, the means for sensing insertion 34 is provided by a mechanical switch that is operably positioned to as to be manually manipulated when the second connector 48 is physically inserted into the auxiliary port 32. Obviously, if a wireless connection is utilized, a more complicated electronic trigger would be required to sense the wireless connection between the auxiliary port 32 (a transmitter/receiver in the embodiment) and the second connector 48 (a second transmitter/receiver).

The means for sensing insertion 34 operates in conjunction with a means for directing control 36 between the input mechanism 30 and the second input mechanism 50. The means for directing control 36 operates in response to the means for sensing insertion 34 such that the input mechanism 30 is operatively connected with the connector 28 until the second connector 48 is inserted into the auxiliary port 32, upon which the operative connection is switched to the second input mechanism 50. The means for directing control 36 is preferably a component of the control circuit board 24, or a control device operable associated therewith, and can be designed by one skilled in the art of electronics design.

As shown in FIGS. 1–8, the child's mouse controller 40 includes a second housing 42, a second control circuit board 44 mounted within the second housing 42, a second connector 48 adapted to be operably connectable to the auxiliary port 32, a second communication cable 46 for operably connecting the second connector 48 to the second control circuit board 44, and a second input mechanism 50 operatively mounted on or in the second housing 42.

As shown in FIGS. 1 and 3–10, the second housing 42 is preferably a molded plastic housing 22 that is shaped to resemble an item of interest to a child, such as a space ship (FIG. 1), a dinosaur (FIG. 3), a mouse (FIG. 4), a race car (FIG. 5), an elephant (FIG. 6), a ladybug (FIG. 7), a butterfly (FIG. 8), a jet (FIG. 9), or any other item that might be of interest to a child. The second housing 42 includes an upwardly facing surface 43 upon which the child can rest his or her hand while controlling the mouse. It is not actually critical that the upwardly facing surface actually face a certain direction, but that the upwardly facing surface be shaped to ergonomically contact the hand of the child while he or she is using the child's mouse controller 40.

Figure 3:
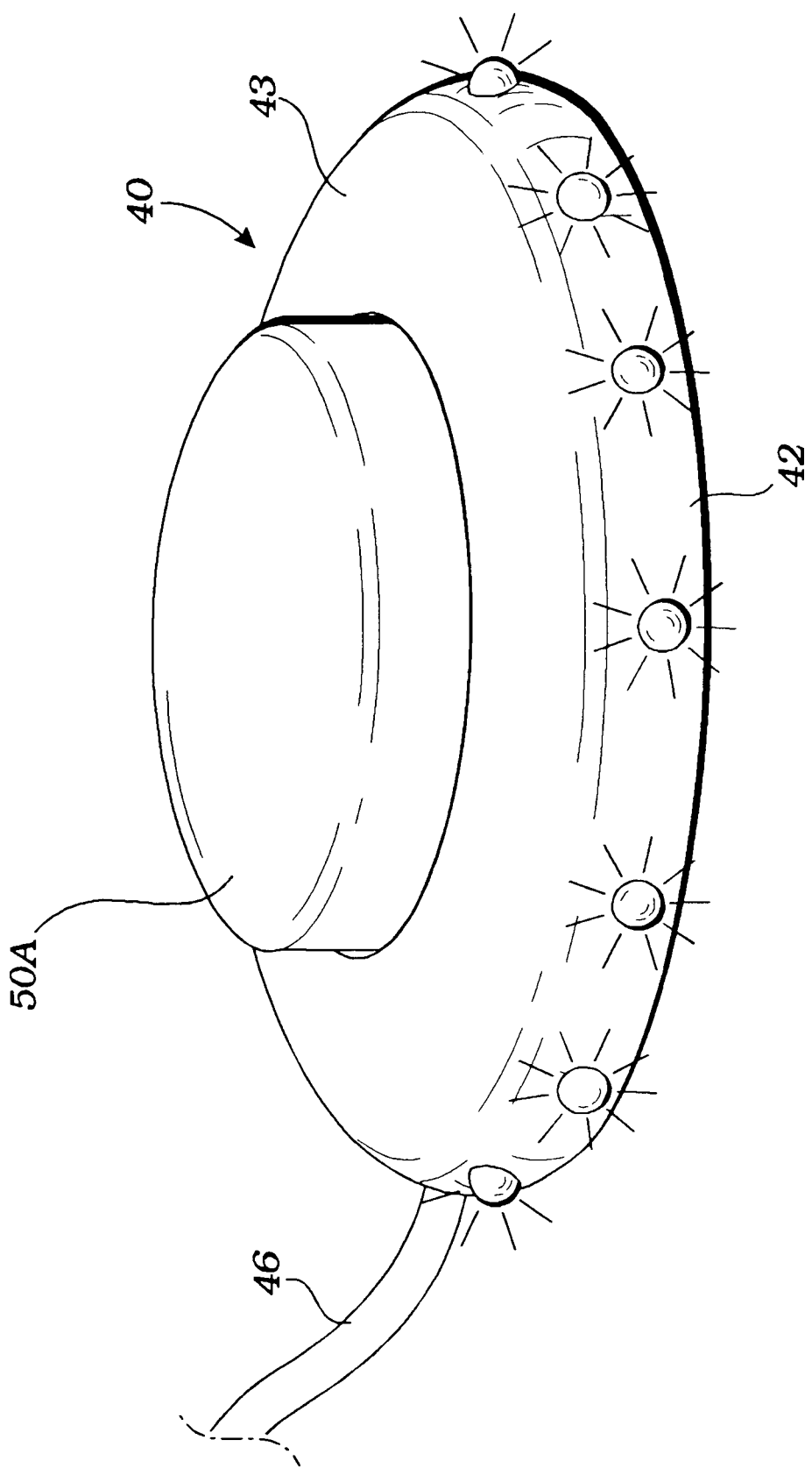
FIG. 3 is a perspective view of a first alternative embodiment of the child's mouse controller.
Figure 4:
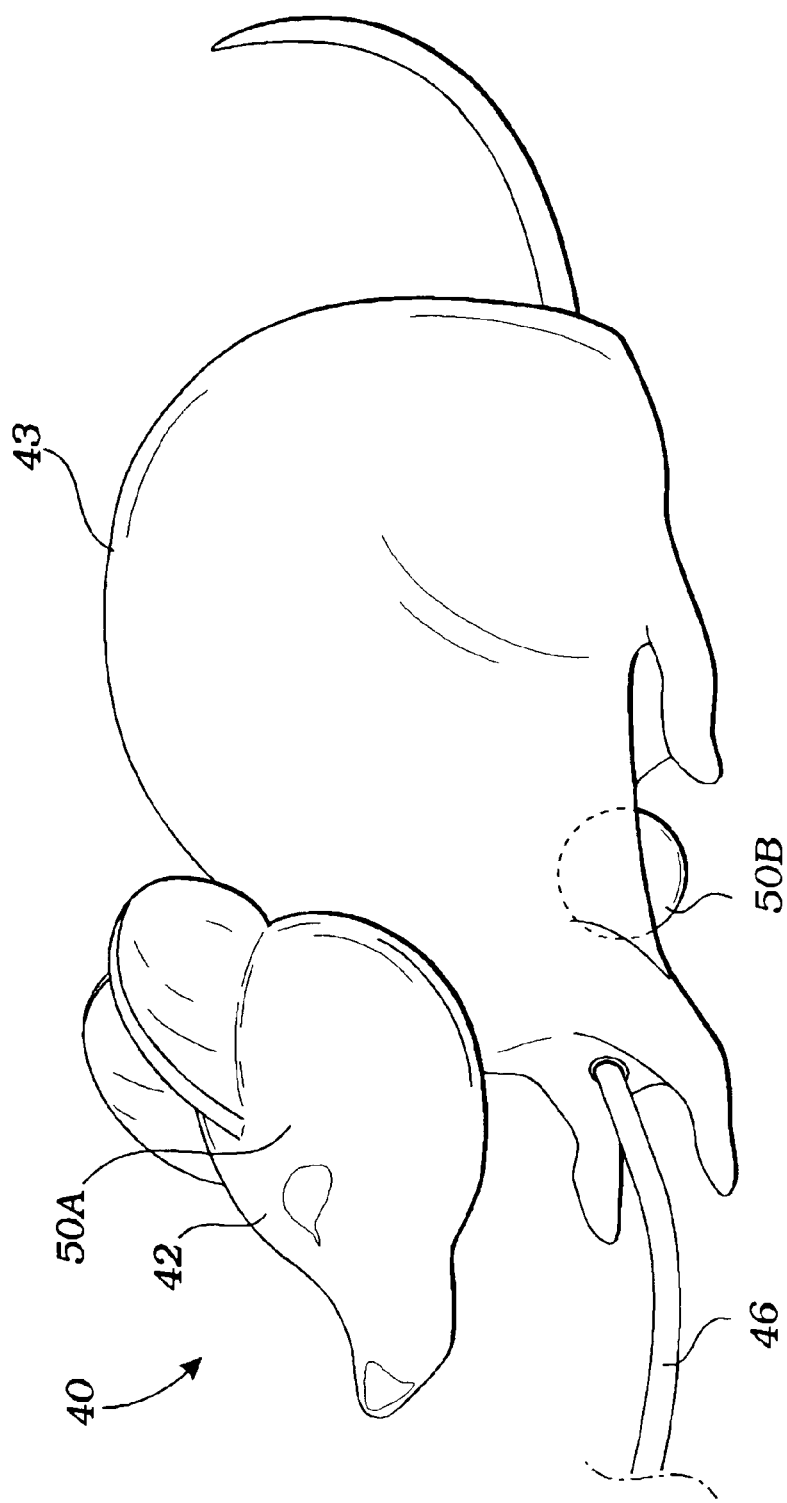
FIG. 4 is a perspective view of a second alternative embodiment of the child's mouse controller.
Figure 5:
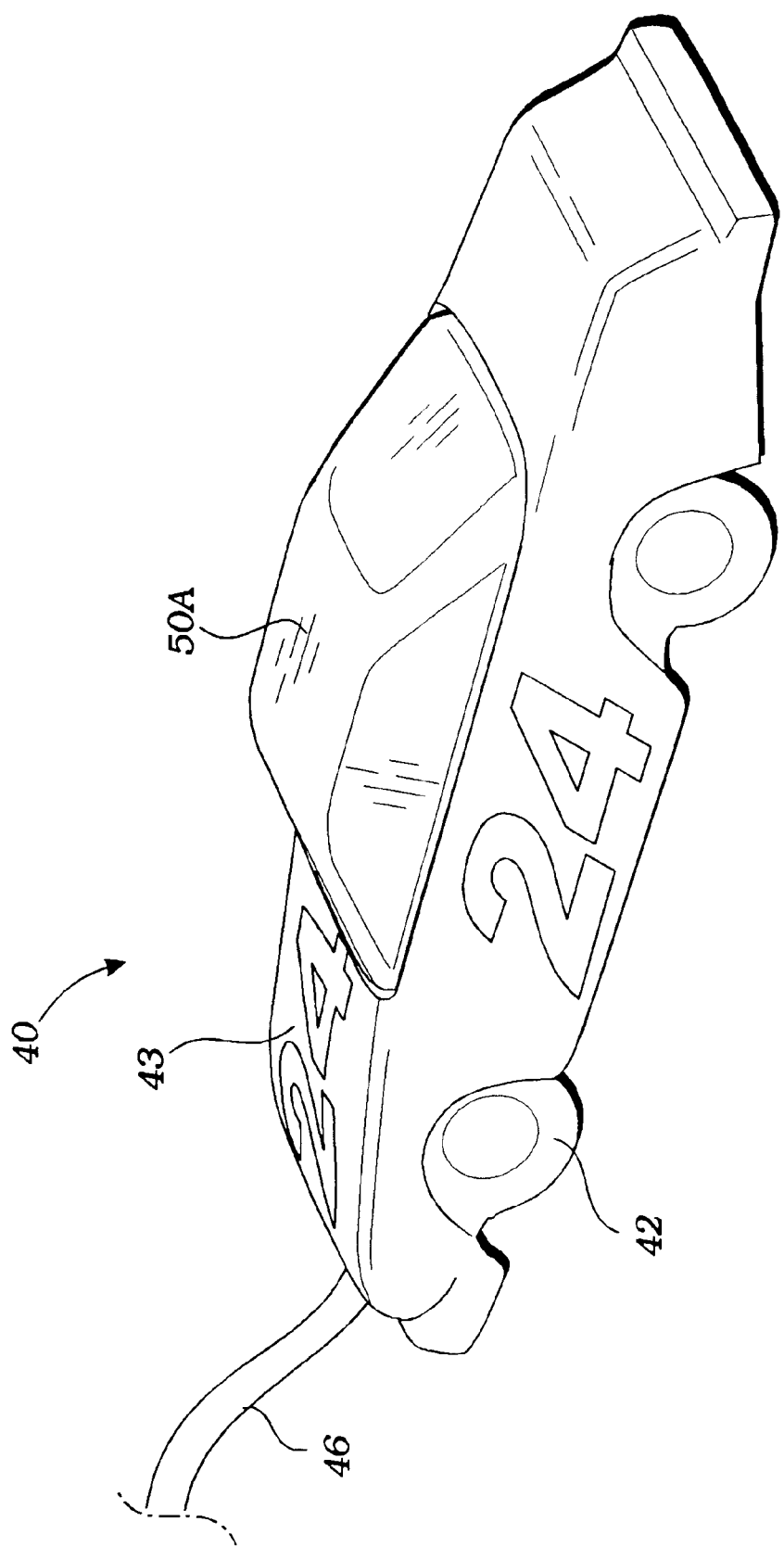
FIG. 5 is a perspective view of a third alternative embodiment of the child's mouse controller.
Figure 6:
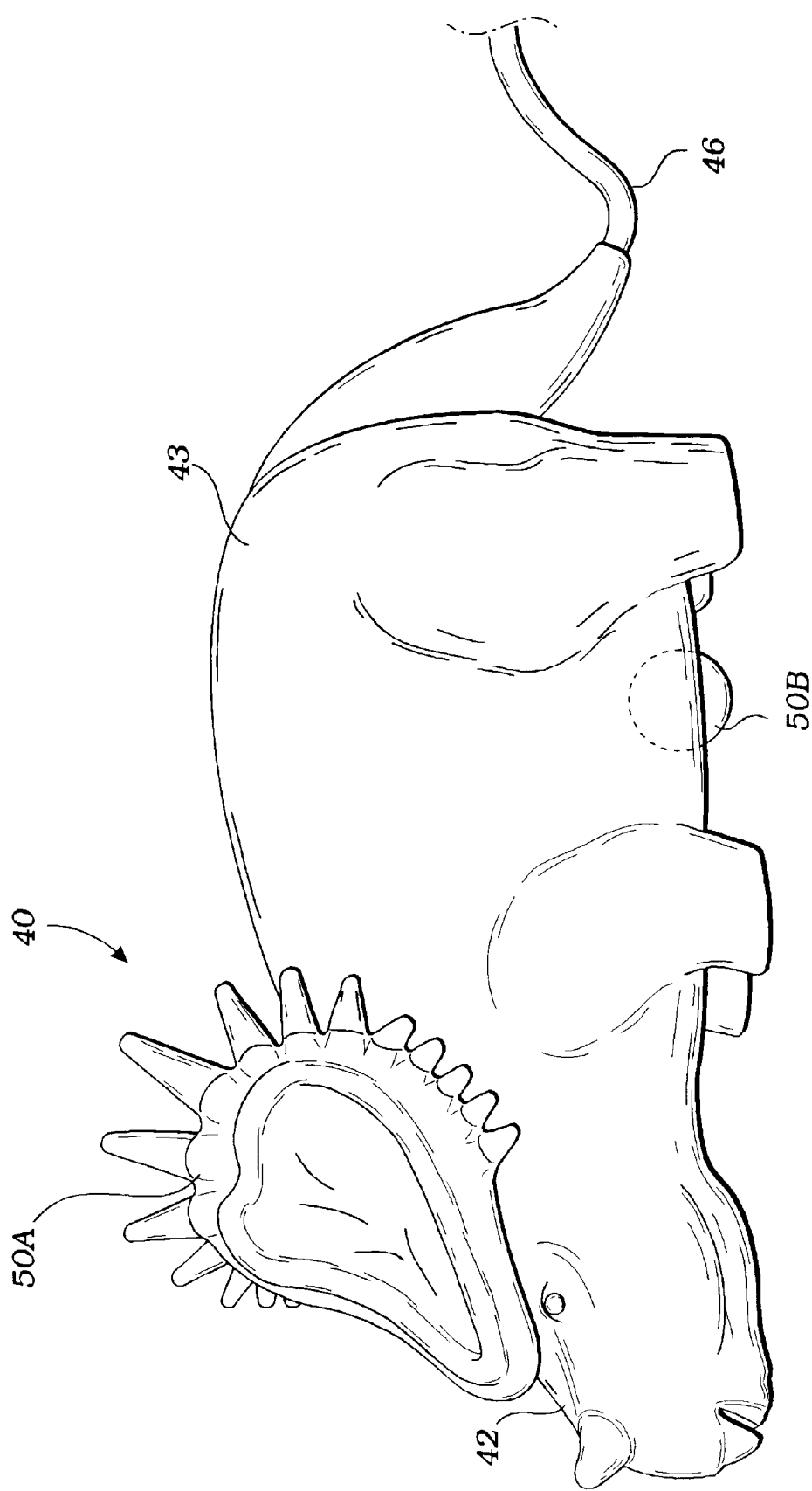
FIG. 6 is a perspective view of a fourth alternative embodiment of the child's mouse controller.
Figure 7:
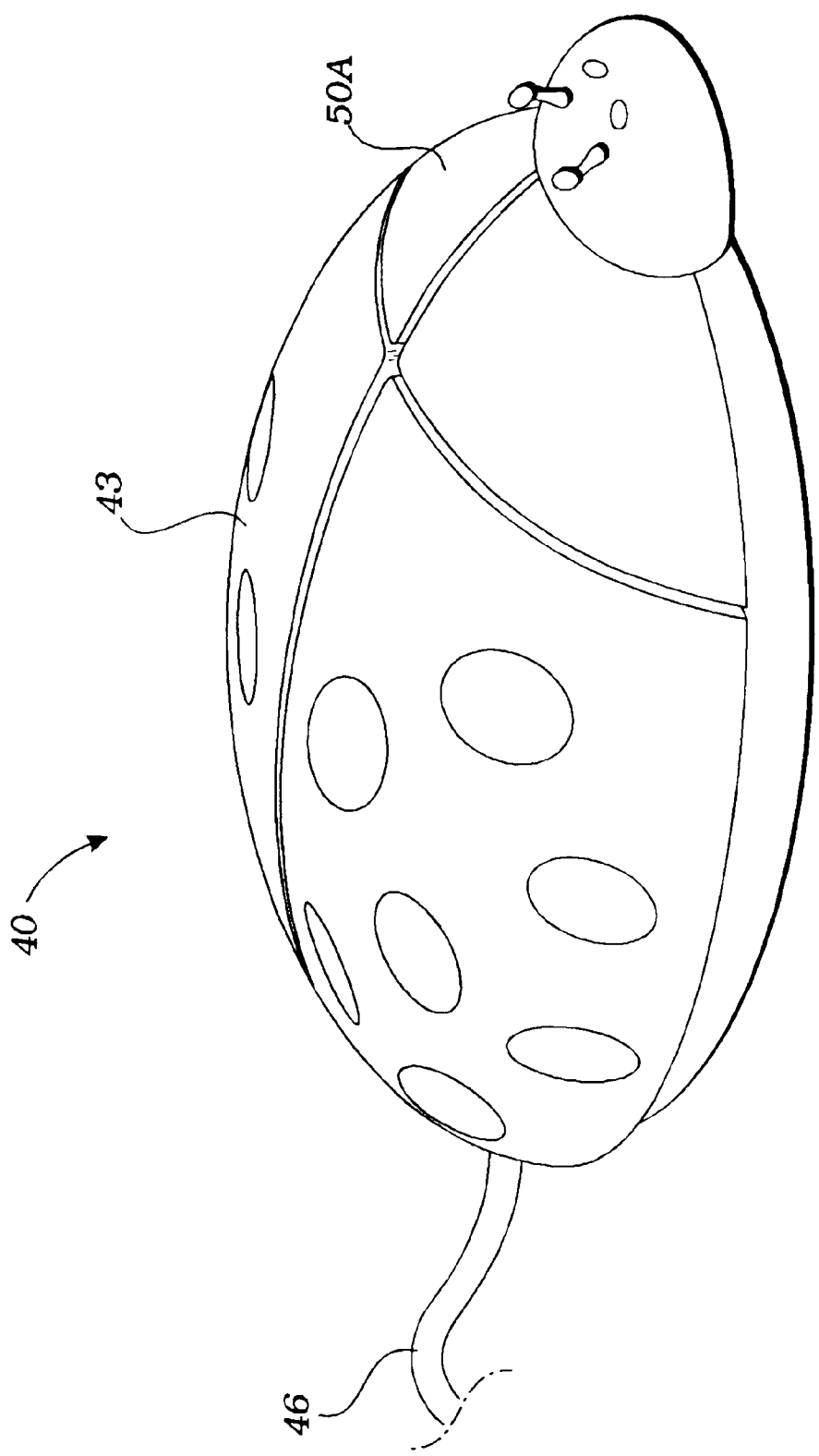
FIG. 7 is a perspective view of a fifth alternative embodiment of the child's mouse controller.
Figure 8:
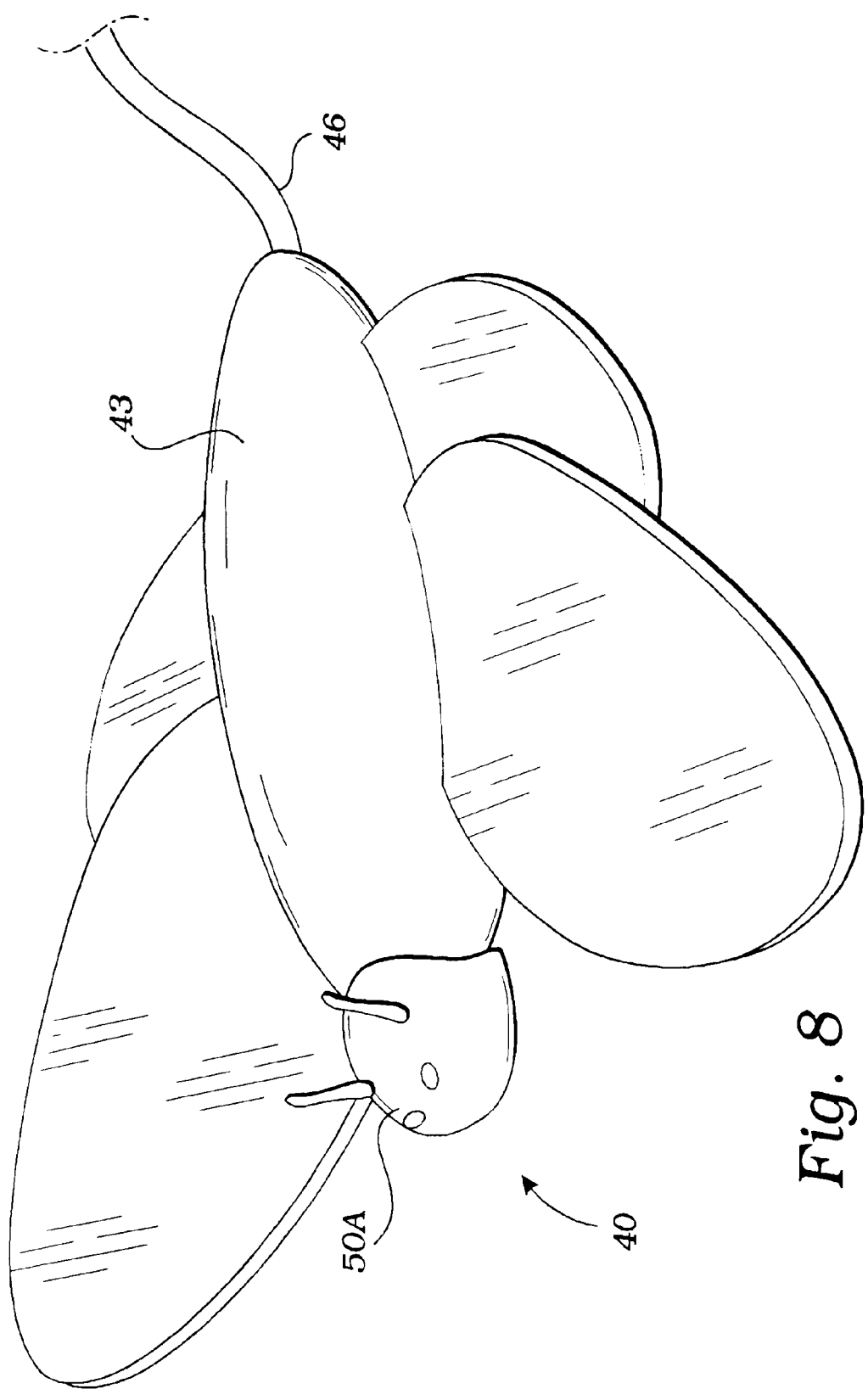
FIG. 8 is a perspective view of a fifth alternative embodiment of the child's mouse controller.
Figure 9:
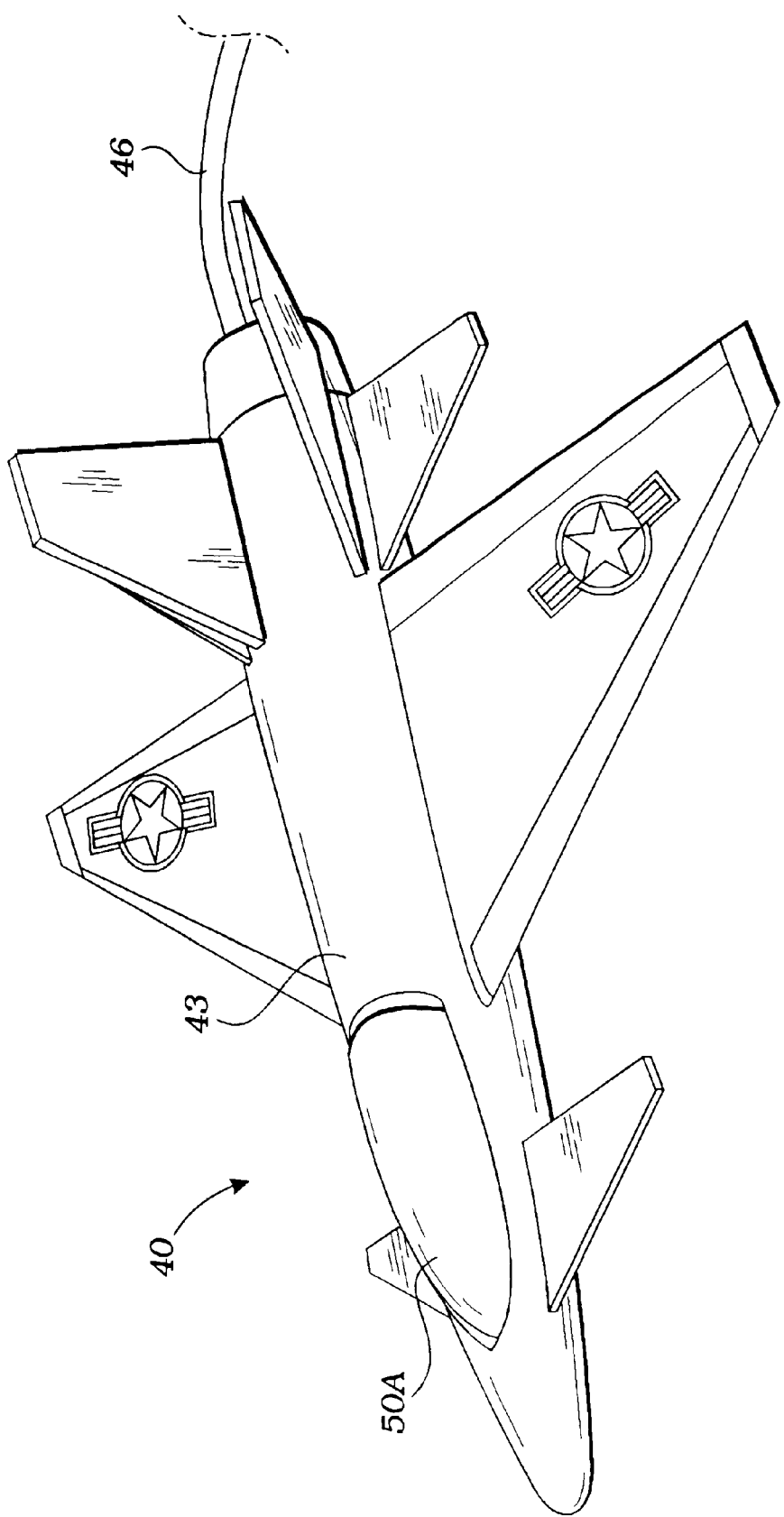
FIG. 9 is a perspective view of a sixth alternative embodiment of the child's mouse controller.
Figure 10:
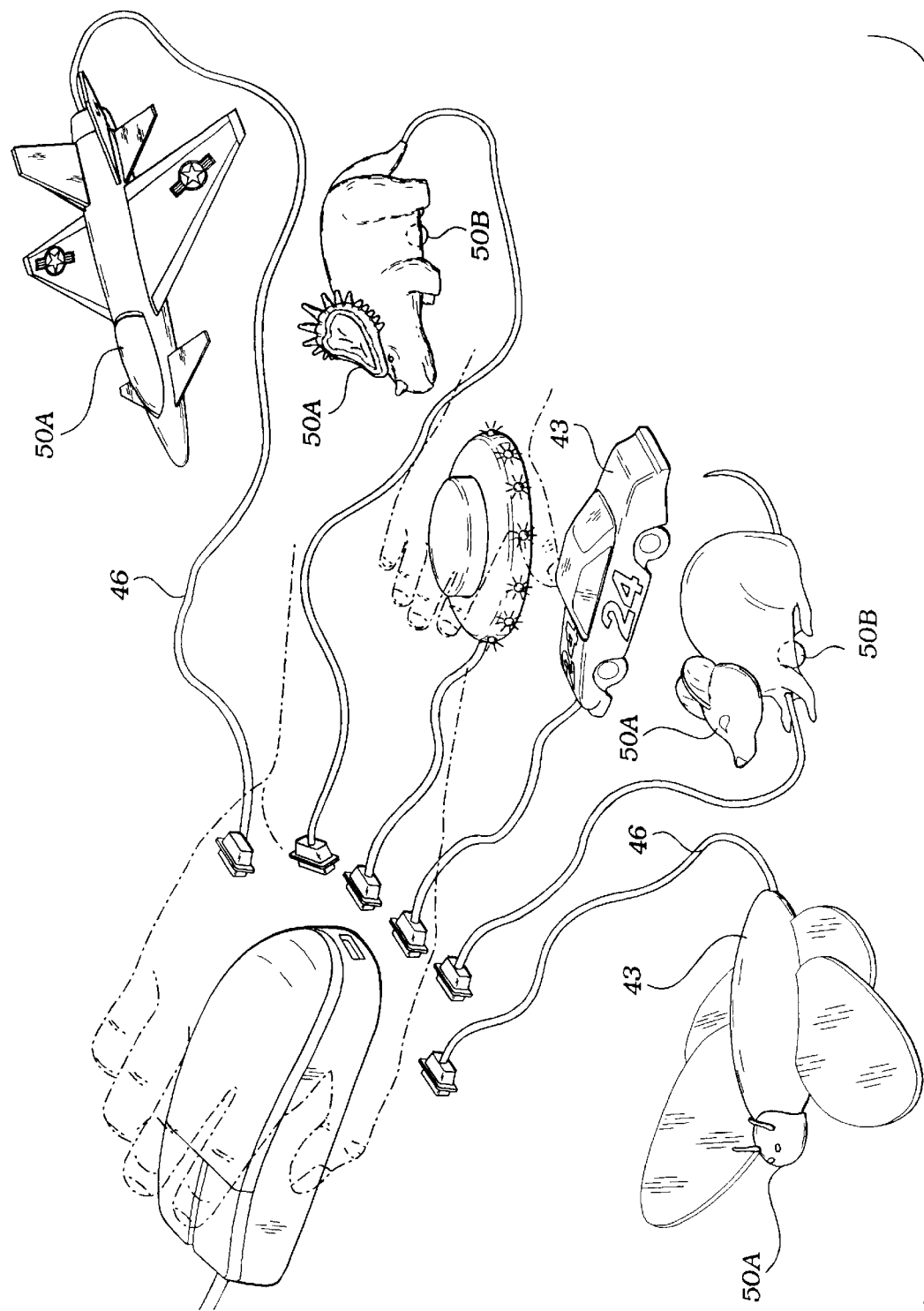
FIG. 10 is a perspective view illustrating how any of a wide variety of child's mouse controller may be used in conjunction with the primary mouse controller.

As shown in FIG. 2, the second control circuit board 44 functions to operably connect the second connector 48 to the second input mechanism 50, and is generally similar to mouse controllers well known in the art. As shown in FIG. 1, the second input mechanism 50 preferably includes a child's button 50A and a child's roller ball 50B. The child's roller ball 50B is preferably similar to the roller ball 30C. The child's button 50A is preferably an oversized button that is integrated with the structure of the second housing 42. For example, when the second housing 42 is shaped like a space ship, as shown in FIG. 1, the child's button 50A is preferably a portion of the top of the space ship. When the second housing 42 is shaped like a dinosaur, as shown in FIG. 3, the child's button 50A is preferably a scale, horn, or other portion of the dinosaur. When the second housing 42 is shaped like a mouse, as shown in FIG. 4, the child's button 50A is preferably an ear of the mouse. Those skilled in the art can devise many similar embodiments.

In the preferred embodiment, the child's button 50A constitutes at least 25% of the upwardly facing surface, and the child's button 50A can constitute at least 33% or even at least 50% of the upwardly facing surface in some embodiments. The benefit of the unusually large surface area of the child's button 50A with respect to the upwardly facing surface is that this construction makes the child's mouse controller 40 easier for the child to control despite the often clumsy manual dexterity of the child.

In use, the connector 28 is inserted into the computer port 12, thereby operatively engaging the input mechanism 30 of the primary mouse controller 20 with the computer 10. In this configuration, the primary mouse controller 20 can be used to operatively control the computer 10, just as with prior art mouse controllers. The primary mouse controller 20 is not very well suited for use by a child, however, because the housing 22 is shaped to fit the hand of an adult, not the hand of a child. When the child wishes to use the computer 10 using the present combination, however, the change of control is simple. The second connector 48 of the child's mouse controller 40 is inserted into the auxiliary port 32. Once inserted, the means for sensing insertion 34 senses the second connector 48 being inserted into the auxiliary port 32 and triggers the means for direction control to operatively engaging the second input mechanism 50 of the child's mouse controller 40 with the computer 10.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A primary mouse controller that enables the operative control of a computer through a computer port using either the primary mouse controller or a child's mouse controller that is adapted to be attached with a second connector to the primary mouse controller, the primary mouse controller comprising:

a housing;

a control circuit board mounted within the housing;

a connector adapted to operably connect the control circuit board with the computer port through a first communication cable;

an input mechanism operatively mounted on or in the housing and operatively connected to the control circuit board;

an auxiliary port operatively mounted on or in the housing and operatively connected to the control circuit board, the auxiliary port being positioned to receive the second connector;

a means for sensing insertion of the second connector into the auxiliary port; and a means for directing control between the input mechanism and the auxiliary port in response to the means for sensing insertion such that the input mechanism is operatively connected with the connector until the second connector is inserted into the auxiliary port, upon which the operative connection is switched from the input mechanism to the auxiliary port.

2. The primary mouse controller of claim 1 wherein the input mechanism includes a roller ball and first and second buttons.

3. A combination primary mouse controller and child's mouse controller for controlling a computer through a computer port, the combination comprising:

a primary mouse controller having
   a housing,
   a control circuit board mounted within the housing,
   a connector adapted to operably connect the control circuit board with the computer port through a first communication cable,
   an input mechanism operatively mounted on or in the housing and operatively connected to the control circuit board, and
   an auxiliary port operatively mounted on or in the housing and operatively connected to the control circuit board;

a child's mouse controller having
   a second housing,
   a second control circuit board mounted within the second housing,
   a second connector adapted to be operably connectable to the auxiliary port,
   a second communication cable for operably connecting the second connector to the second control circuit board, and
   a second input mechanism operatively mounted on or in the second housing;

a means for sensing insertion of the second connector into the auxiliary port; and a means for directing control between the input mechanism and the second input mechanism in response to the means for sensing insertion such that the input mechanism is operatively connected with the connector until the second connector is inserted into the auxiliary port, upon which the operative connection is switched to the second input mechanism.

4. The combination of claim 3 wherein the input mechanism includes a roller ball and first and second buttons and wherein the second input mechanism includes a child's roller ball and a child's button.

5. The combination of claim 4 wherein the second housing has an upwardly facing surface and wherein the child's button constitutes at least 25% of the upwardly facing surface.

6. The combination of claim 4 wherein the second housing has an upwardly facing surface and wherein the child's button constitutes at least 33% of the upwardly facing surface.

7. The combination of claim 4 wherein the second housing has an upwardly facing surface and wherein the child's button constitutes at least 50% of the upwardly facing surface.

* * * * *